(12) United States Patent
Lequippe

(10) Patent No.: US 10,746,902 B2
(45) Date of Patent: Aug. 18, 2020

(54) MIRROR WITH IMPROVED DURABILITY

(71) Applicant: SAINT-GOBAIN GLASS FRANCE, Courbevoie (FR)

(72) Inventor: Guillaume Lequippe, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 204 days.

(21) Appl. No.: 15/579,048

(22) PCT Filed: May 31, 2016

(86) PCT No.: PCT/FR2016/051296
§ 371 (c)(1),
(2) Date: Dec. 1, 2017

(87) PCT Pub. No.: WO2016/193611
PCT Pub. Date: Dec. 8, 2016

(65) Prior Publication Data
US 2018/0172883 A1    Jun. 21, 2018

(30) Foreign Application Priority Data

Jun. 2, 2015  (FR) ...................................... 15 55007

(51) Int. Cl.
| | | |
|---|---|---|
| *G02B 7/18* | (2006.01) | |
| *G02B 1/14* | (2015.01) | |
| *C03C 17/36* | (2006.01) | |
| *C03C 17/38* | (2006.01) | |
| *G02B 5/08* | (2006.01) | |

(52) U.S. Cl.
CPC ............ *G02B 1/14* (2015.01); *C03C 17/3644* (2013.01); *C03C 17/3663* (2013.01); *C03C 17/38* (2013.01); *G02B 5/0808* (2013.01); *C03C 2217/256* (2013.01); *C03C 2217/78* (2013.01); *C03C 2218/112* (2013.01); *C03C 2218/31* (2013.01)

(58) Field of Classification Search
CPC .... G02B 1/14; G02B 5/0808; C03C 17/3644; C03C 17/38; C03C 17/3663; C03C 2218/31; C03C 2218/112; C03C 2217/78; C03C 2217/256; C03C 2218/118; C03C 2218/119; C03C 2218/111
USPC ........................................................ 359/514
See application file for complete search history.

(56) References Cited

U.S. PATENT DOCUMENTS

| | | | | |
|---|---|---|---|---|
| 4,745,003 A | * | 5/1988 | Sirkoch ................. | G02B 1/105 427/162 |
| 5,677,053 A | * | 10/1997 | Moriga .................... | B05D 7/54 427/384 |
| 6,390,636 B1 | * | 5/2002 | Takahagi ............ | C23C 18/1655 359/883 |
| 2007/0205395 A1 | | 9/2007 | Nakajima et al. | |

FOREIGN PATENT DOCUMENTS

| | | |
|---|---|---|
| EP | 2 377 094 A1 | 10/2011 |
| EP | 2 555 021 A1 | 2/2013 |
| FR | 2 719 839 A1 | 11/1995 |
| FR | 2 936 240 A1 | 3/2010 |
| WO | WO 2006/121517 A1 | 11/2006 |
| WO | WO 2010/037867 A1 | 4/2010 |
| WO | WO 2010/038224 A1 | 4/2010 |
| WO | WO 2014/157355 A1 | 10/2014 |

OTHER PUBLICATIONS

International Search Report as issued in International Patent Application No. PCT/FR2016/051296, dated Oct. 6, 2016.
"Polyrotaxane," Mar. 2, 2016, Retrieved from the Internet: URL:https://fr.wikipedia.org/w/index.php?title=Special:Livre&bookcmd=download&collectionid=685705a3bfla195eafe2fb495elled7c196ceff5&writer=rdf2latex&return_to=Polyrota xane [retrieved on Mar. 2, 2016], XP055254779.
Polyrotaxane: "Polyrotaxane-based paint," Mar. 2, 2016 (Mar. 2, 2016), Retrieved from the Internet: URL:https://en.wikipedia.org/w/index.php?title=Special:Book&bookcmd=download&collectionid=09be0499a0c6917f13aalb4f88d88ea9058d910f&writer=rdf2latex&return-to=Polyrotax ane-based paint [retrieved on Mar. 2, 2016], XP055254787.

* cited by examiner

*Primary Examiner* — Euncha P Cherry
(74) *Attorney, Agent, or Firm* — Pillsbury Winthrop Shaw Pittman LLP

(57) ABSTRACT

A mirror includes a transparent substrate, at least one metallic reflecting layer and at least one protective paint layer on the back of the mirror. The mirror also includes an overlayer which is a barrier to corrosive elements, such as sulfides and/or chlorides, with a thickness of less than or equal to 6 μm which is located on the protective layer. The process for the manufacture of such a mirror is also described.

18 Claims, No Drawings

MIRROR WITH IMPROVED DURABILITY

CROSS-REFERENCE TO RELATED APPLICATIONS

This application is the U.S. National Stage of PCT/FR2016/051296, filed May 31, 2016, which in turn claims priority to French patent application number 1555007 filed Jun. 2, 2015. The content of these applications are incorporated herein by reference in their entireties.

FIELD

The invention relates to a mirror having an improved durability and also to its process of manufacture.

BACKGROUND

Mirrors generally comprise a glass substrate on which a metallic reflecting layer has been deposited. This reflecting layer is generally made of silver or of aluminum and has a tendency to corrode in the ambient air due to the presence of pollutants present in the atmosphere. It is consequently essential to protect it in order to increase the durability of the mirrors. In silvered mirrors, a treatment with tin is often carried out after the silvering for the purpose, on the one hand, of promoting adhesion of the upper layers and, on the other hand, of potentially improving the resistance to corrosion of the silver. One or more protective layers, for example based on copper or based on paints, are subsequently deposited on the silvered substrate. Mention may be made, for example, of the patent application FR 2 936 440, which describes a mirror comprising a protective coating combining two successive layers of paints of different types. These paints can be of organic type or of inorganic type and be solvent-based or water-based. Typically, the total thickness of this protective layer of paint, once dry, is approximately 50 µm. This thickness makes it possible in particular to provide protection against corrosion and thus improves the durability of the mirror. The paint also makes it possible to obtain the opaqueness on the rear face of the mirror, desired in particular for indoor mirrors. The choice or development of the paints and of the processes for the manufacture of the mirrors make it possible to guarantee a protection against corrosion which meets the thresholds imposed by the European standard EN ISO 1036. The mirrors obtained have in particular values which are acceptable during the tests carried out in a copper/acetic acid saline medium (also known under the name of CASS or copper accelerated acetic acid salt spray test described in the standard EN ISO 9227). However, the aim is to further improve the durability of mirrors, especially under real conditions of chemical stresses, in particular in the presence of sulfidizing corrosion and/or corrosion by chlorides, while keeping the production costs comparable to those of the solutions currently on the market.

SUMMARY

The present invention comes within this context. The inventors have discovered, surprisingly, that it is possible to very markedly improve the durability of mirrors and in particular their resistance to corrosion by sulfides and by chlorides by depositing a thin overlayer directly on the protective paint layer, thus making it possible to render the latter more compact by closing up the open porosity or the porosity emerging at the surface.

The present invention relates to a mirror comprising a transparent glass substrate, at least one metallic reflecting layer and at least one protective paint layer on the back of the mirror, said mirror comprising an overlayer which is a barrier to corrosive elements, such as sulfides and/or chlorides, with a thickness of less than 6 µm which is located on the protective layer.

The present invention also relates to the process for the manufacture of the mirror described above.

The process for the manufacture of said mirror comprises:
a. an optional stage of sensitization,
b. an optional stage of activation of the surface of the substrate to be coated,
c. a stage of deposition of at least one metallic reflecting layer on a transparent substrate,
d. a stage of deposition of at least one protective paint layer,
e. a stage of deposition of an overlayer which is a barrier to corrosive entities, such as sulfides and chlorides, with a thickness of less than 6 µm, on said protective layer, making it possible to block the porosity of the latter, and
f. a stage of drying said overlayer.

DETAILED DESCRIPTION

An aspect of the present invention relates to a mirror comprising a transparent glass substrate, at least one metallic reflecting layer and at least one protective paint layer on the back of the mirror, said mirror comprising an overlayer which is a barrier to corrosive elements, such as sulfides and/or chlorides, with a thickness of less than 6 µm which is located on the protective layer.

Preferably, the thickness of the barrier overlayer is less than or equal to 3 µm and more preferably still it is less than or equal to 1 µm. The thickness of the overlayer is advantageously as low as possible. This overlayer is positioned directly on the protective layer placed on the back of the mirror, that is to say on the paint layer. Due to its composition, given that the paint is a mixture of fillers different in nature and in particle size distribution, the paint exhibits a natural porosity in the microscopic state. This porosity can constitute points of entry for corrosive elements and thus open preferred routes for diffusion of these entities. The overlayer deposited on the protective paint layer advantageously makes it possible to close the porosity of the paint layer and thus to limit, indeed even eliminate, routes for diffusion of corrosive entities. The durability of mirrors comprising the overlayer placed on the protective paint layer is thus markedly improved.

The barrier overlayer can be a layer of uniform thickness. Its thickness is thus even and identical over the whole of the rear face of the mirror. It is then also possible to refer to continuous overlayer.

The barrier overlayer can also be a noncontinuous layer, the thickness of which may not be uniform. It is essential for this overlayer to block the existing porosity in the protective paint layer, without necessarily having a homogeneous thickness.

The barrier overlayer is the outermost layer located on the back of the mirror. It is the layer in contact with the ambient air. This overlayer is a resin. Preferably, this resin is organic. Mention will, for example, be made of acrylic, vinyl, polyurethane, polyester, epoxy, alkyd or styrene resins. The choice of material used is guided by the fact that this type of resin preferably belongs to the family of the polymers. It is not necessary for the overlayer to give any chemical functionality to the mirror. The essential role of the overlayer is to fill the porous cavities which may exist in the protective paint layer. Preferably, the overlayer is based on an alkyd, acrylic, epoxy or polyester resin. Advantageously, the overlayer is based on an alkyd, acrylic or polyester resin. The resins can be of the same chemical nature as the organic binders present in the paint formulations. It is thus possible to choose an overlayer based on a resin identical to the binders present in the protective paint layer, which makes it possible to also ensure good chemical compatibility between the entities present in the protective paint layer and in the overlayer.

The paint used to form the protective layer is a water-based or organic paint. The thickness of this protective layer is at most 100 µm. Preferably, it is at most 50 µm. Its thickness can vary as a function of type of paint used. The role of this protective layer is essentially an optical and mechanical role. It also contributes to improving the durability of the mirror with respect to chemical and corrosive attacks. It is possible to use inexpensive paints, the essential role of which is to provide the desired opacity on the rear face of the mirror. In the interest of observing the EHS standards and in particular the European Directive 2004/42/EC, "Decopaint", it is advisable to use paints containing less than 130 g/l of organic solvents, thus limiting the emission of volatile organic compounds (VOCs) on the site of manufacture.

The transparent substrate is a bent or unbent sheet of mineral glass. Its thickness varies between 2 and 8 mm. The glass is preferably extra-clear, that is to say exhibiting a light transmission of greater than 85%, indeed even of greater than 89%, for a thickness of 3.2 mm. All the layers constituting the mirror are deposited on one and the same side of the transparent substrate, the overlayer being the outermost layer of the stack.

The metallic reflecting layer, preferably made of silver, has a thickness varying between 500 and 1600 mg/m$^2$. For applications as domestic mirrors, such as, for example, bathroom mirrors, a conventional silver layer has a thickness of 700 to 1000 mg/m$^2$.

The reflecting layer can also be made of aluminum for applications as domestic mirrors.

In order to improve the adhesion of the different layers to one another and/or to the substrate, the mirror can comprise a layer of tie primer conventionally based on silane. This layer can be deposited between the metallic reflecting layer and the protective paint layer, between the substrate and the metallic reflecting layer, or optionally between the paint layer and the barrier overlayer. In the case where an adhesion primer is deposited on the paint layer in order to improve adhesion of the overlayer, it is still considered that the overlayer which is a barrier to corrosive elements is located directly on the paint-based protective layer. This is because the adhesion primer layer is a very thin layer, very often monoatomic, which does not necessarily make it possible, by itself alone, to close the porosity of the paint layer.

The present invention also relates to the process for the manufacture of the mirror described above.

The process for the manufacture of said mirror comprises:
a. an optional stage of sensitization,
b. an optional stage of activation of the surface of the substrate to be coated,
c. a stage of deposition of at least one metallic reflecting layer on a transparent substrate,
d. a stage of deposition of at least one protective paint layer,
e. a stage of deposition of an overlayer which is a barrier to corrosive entities, such as sulfides and chlorides, with a thickness of less than 6 µm, on said protective layer, making it possible to block the porosity of the latter, and
f. a stage of drying said overlayer.

As known to a person skilled in the art, the manufacture of a mirror comprises several stages before the deposition of the metallic reflecting layer: the surface of the substrate is brightened and then one of its faces is sensitized, for example with a stannous chloride solution. It is subsequently possible to activate the same face with a palladium chloride solution. These stages are optional in the manufacturing process according to the present invention.

The deposition of the metallic reflecting layer, such as silver, is then carried out by techniques known to a person skilled in the art. The deposition can be carried out in the vapor phase, in particular by CVD, PVD or magnetron, or by the liquid route, in particular starting from a silvering solution.

The process for the manufacture of a mirror according to the present invention comprises an optional stage of sensitization, an optional stage of activation of the surface of the substrate to be coated, a stage of deposition of the metallic reflecting layer and a stage of deposition of the protective paint layer. It additionally comprises a stage of deposition of an overlayer which is a barrier to corrosive entities, such as sulfides and chlorides, with a thickness of less than 6 µm, on said protective layer, making it possible to close the surface porosity of the latter, and then a stage of drying said overlayer.

The protective paint layer can be applied by different techniques: mention will be made, for example, of the spraying techniques or of the curtain coating, film drawer or roller techniques. The drying temperatures and times of the paint layer can vary as a function of the type of paint used and of the thickness of the paint layer. The drying can be carried out under hot air or else by IR curing. If the paint is crosslinkable under UV radiation, the drying stage can be carried out under UV lamps. It is also possible to combine these different drying methods and to carry out the drying stage under UV lamps with hot air and IR curing.

The stage of deposition of the barrier overlayer is carried out by the liquid route by spraying, with a roller, by dip-coating, by curtain coating or by sprinkling. This deposition stage can also be carried out by screen printing. The deposition is carried out by methods known to a person skilled in the art. It is sometimes necessary for the deposition stage to be followed by a wringing or scraping stage which makes it possible to remove the surplus material which might have been deposited during the stage of deposition of the overlayer. The deposition stage can also be followed by a pass under an air knife in order to remove any surplus material. This is because the barrier overlayer has to be as thin as possible and preferably has a thickness of less than 3 µm and more preferably still of less than 1 µm. It makes it possible to increase the compactness of the protective paint layer by closing its open porosity.

Thus, when the stage of deposition of the overlayer is carried out by spraying or by curtain coating, it is followed by a scraping stage, so as to obtain the thinnest possible overlayer.

According to certain embodiments, the stages of deposition and of scraping can be carried out simultaneously, using a roller, the direction of rotation of which can vary.

The process according to the invention additionally comprises a stage of drying the barrier overlayer which can be carried out under hot air, by IR curing and/or UV curing. The choice of the method of drying is preferably made as a function of the type of organic resin used. For example, if the barrier overlayer is based on a resin which is crosslinkable under UV radiation, the drying stage can be carried out under UV lamps.

Each of stages c), d) and/or e) can be preceded by an optional stage of deposition of an adhesion primer, for example of the silane type, by any technique known to a person skilled in the art.

The present invention also relates to the use of a mirror as described above or manufactured according to the manufacturing process of the present invention as indoor mirror.

The examples below illustrate the invention without limiting the scope thereof.

Examples

Samples were prepared and different tests were carried out on these samples in order to confirm their durability. A test has been developed to evaluate the resistance of the barrier layer and of the protective paint layer to the diffusion of sulfur-comprising compounds. In order to carry out this test, the percentage of light reflection is analyzed as a function of time on samples, the layer to be analyzed of which is covered with rubber. The samples on which the rubber is laid down are placed in a drying oven at 130° C. in order to accelerate the process of diffusion of the sulfur-comprising compounds present in the rubber. Light reflection measurements are subsequently carried out after 60 and 180 minutes, and the percentage of loss of light reflection is estimated with respect to a value measured at T=0 (before the positioning of the rubber).

Corrosion tests were carried out according to the standard EN ISO 9227.

The measurements of thickness of layers are carried out by micrometric section measurement methods (Paint Borer 518 device from Erichsen). The resin thicknesses deposited were measured on a 2D/3D Taylor Hobson profilometer.

Measurements of adhesion of the layers are determined with the automatic cross hatch device from Erichsen (type 430) and correspond to the cross hatch test described in the standard NF ISO 2409 on paints and varnishes. This test consists in carrying out a visual interpretation of the surface of the cross hatch pattern on which flaking can be produced with a 1 mm comb. The classification takes place on a scale of 0 to 5 according to whether the layer comes off to a greater or lesser extent. A value of 0 indicates a very good adhesion of the layer.

Different mirrors with a size of 400 mm×300 mm were prepared by depositing a metallic reflecting layer made of silver with a thickness of approximately 750 mg/m$^2$ on a substrate made of glass of the Planilux® type, after a stage of sensitization of the substrate using a solution based on SnCl$_2$. The mirrors comprise a tin passivation layer deposited by the liquid route, with a thickness of approximately ten nanometers, and a silane-based tie primer layer with a thickness of approximately 10 nm located between the metallic reflecting layer made of silver and the protective paint layer.

Several samples were thus prepared by changing the paints used for the protective layer:
   paint 1: organic paint of alkyd type (One Coat LF3 Grey, sold by Fenzi),
   paint 2: water-based acrylic paint (WBLF4 LPB Blue 3025, sold by Fenzi).

Two different resins were tested to form the barrier overlayer:
   resin A: acrylate resin (G1000UV, sold by Henkel),
   resin B: melamine alkyd resin corresponding to the binder of the paint One Coat LF3 Grey sold by Fenzi.

The resins are applied with a film drawer and are then scraped. The resin B is dried by being placed in a drying oven at 180° C. for 15 minutes in order to make possible the crosslinking thereof. The resin A is crosslinked under UV radiation for 90 seconds (120 W/cm).

The sulfidizing corrosion performances of the different samples were evaluated in drying ovens at 130° C. The percentages of loss of light reflection at 60 minutes and at 180 minutes of the different samples tested are summarized in table 1 below.

TABLE 1

| Sample | % of loss of light reflection at 60 min | % of loss of light reflection at 180 min |
| --- | --- | --- |
| Mirror 1 (not in accordance): 20 μm paint 1 | 83 | 83 |
| Mirror 2 according to the invention: 20 μm of paint 1 covered with 1 μm of resin A | 51 | 80 |
| Mirror 3 according to the invention: 20 μm of paint 1 covered with 2 μm of resin B | 54 | 80 |
| Mirror 4 (not in accordance with the invention): 20 μm of paint 2 | >80 | >80 |
| Mirror 5 (according to the invention): 20 μm of paint 2 covered with 6 μm of resin A | 1 | 1 |

On respectively comparing the mirror 1 with the mirrors 2 and 3, then the mirror 4 with the mirror 5, it is found that, after 60 min, the percentage of decrease is markedly smaller for the mirrors according to the present invention than for the mirrors not in accordance with the invention. After 180 min, the values obtained for the mirrors of the invention are lower than those for the comparative mirrors. This shows the beneficial effect of the barrier overlayer on the resistance to sulfidizing corrosion.

The results obtained for the different mirrors after a cycle in the CASS test (120 h at 50° C., aqueous solution of 50 g/l of NaCl and 0.26 g/l of anhydrous CuCl$_2$, the pH being between 3.2 and 3.3) are summarized in table 2.

TABLE 2

| Sample | Corrosion at the edges (μm) | Full face corrosion |
| --- | --- | --- |
| Mirror 1 (not in accordance): 20 μm paint 1 | Very high | Very high |
| Mirror 2 according to the invention: 20 μm of paint 1 covered with 1 urn of resin A | 200 | Very slight |
| Mirror 3 according to the invention: 20 μm of paint 1 covered with 2 μm of resin B | 113 | Moderate |
| Mirror 4 (not in accordance with the invention): 20 μm of paint 2 | 750 | Moderate |
| Mirror 5 (according to the | 300 | Very slight |

TABLE 2-continued

| Sample | Corrosion at the edges (μm) | Full face corrosion |
|---|---|---|
| invention):<br>20 μm of paint 2 covered with 6 μm of resin A | | |

The results obtained during the CASS tests show that the corrosion is markedly improved when a barrier overlayer of low thickness is applied to the protective paint layer. This is because the size of the region attacked on the edges of the mirror decreases when the barrier overlayer is deposited. The full face corrosion is also improved and becomes very slight or moderate for the mirrors according to the invention.

Adhesion measurements carried out in the cross hatch test for each of the samples have shown that the values obtained were 0 for all the mirrors according to the invention. The barrier overlayer layer thus adheres satisfactorily to the protective paint layers. In order to meet the specifications imposed by the standard ISO 2409, mirrors have to have a grade of less than 2 in the adhesion test.

All these measurements show a marked improvement in the durability of the mirrors according to the present invention.

The invention claimed is:

1. A mirror comprising a transparent glass substrate, at least one metallic reflecting layer and at least one protective paint layer on the back of the mirror, wherein the mirror comprises an overlayer which is a barrier to corrosive elements with a thickness of less than or equal to 1 μm which is located on the protective layer.

2. The mirror as claimed in claim 1, wherein the overlayer is the external layer of the mirror, located on the back of the mirror.

3. The mirror as claimed in claim 1, wherein the overlayer is an organic resin.

4. The mirror as claimed in claim 3, wherein the overlayer is an acrylic, vinyl, polyurethane, polyester, epoxy, alkyd or styrene resin.

5. The mirror as claimed in claim 1, wherein the overlayer is a layer of uniform thickness.

6. The mirror as claimed in claim 1, wherein the overlayer is a noncontinuous layer.

7. The mirror as claimed in claim 1, wherein the protective layer is a layer of water-based or organic paint.

8. The mirror as claimed in claim 1, wherein the thickness of the protective layer is at most 100 μm.

9. The mirror as claimed in claim 1, wherein the metallic reflecting layer is a silver layer.

10. A process for the manufacture of a mirror, comprising:
   a. an optional stage of sensitization,
   b. an optional stage of activation of a surface of a transparent glass substrate to be coated,
   c. a stage of deposition of at least one metallic reflecting layer on the transparent glass substrate,
   d. a stage of deposition of at least one protective layer,
   e. a stage of deposition of an overlayer which is a barrier to corrosive entities with a thickness of less than 1 μm, on said protective layer, to block the porosity of the latter, and
   f. a stage of drying said overlayer.

11. The process as claimed in claim 10, wherein the stage of deposition of overlayer is carried out by the liquid route by spraying, with a roller, by dip-coating, by curtain coating or by sprinkling, or by screen printing techniques.

12. The process as claimed in claim 11, wherein the stage of deposition of the overlayer is carried out by spraying or by curtain coating and is followed by a scraping stage, so as to obtain the thinnest possible overlayer.

13. The process as claimed in claim 11, wherein the stage of deposition of the overlayer is carried out with a roller to simultaneously carry out a scraping stage by rotation of the roller in the reverse direction, so as to obtain the thinnest possible overlayer.

14. The process as claimed in claim 10, wherein the drying stage is carried out under hot air, by IR curing and/or by UV curing.

15. A method comprising utilizing the mirror as claimed in claim 1 as indoor mirror.

16. The mirror as claimed in claim 1, wherein the corrosive elements include sulfides and/or chlorides.

17. The mirror as claimed in claim 8, wherein the thickness of the protective layer is at most 50 μm.

18. The process as claimed in claim 10, wherein the corrosive elements include sulfides and/or chlorides.

* * * * *